April 27, 1954 — H. J. MODREY — 2,676,822
COUPLING DEVICE WITH SINGLE ACTUATING SLEEVE
Filed Dec. 21, 1948 — 2 Sheets-Sheet 1
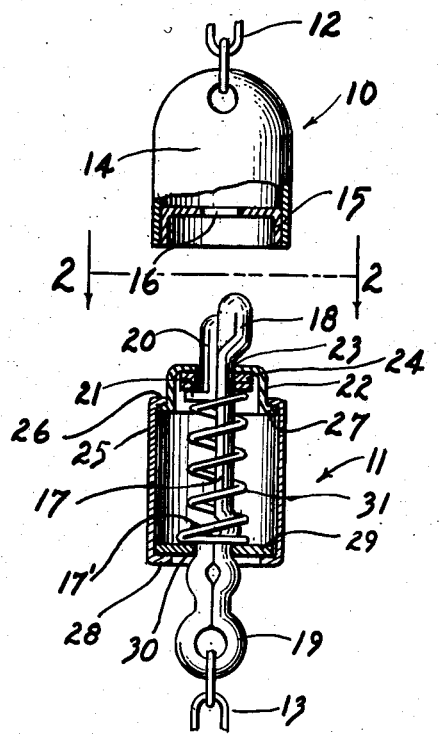
fig. 1
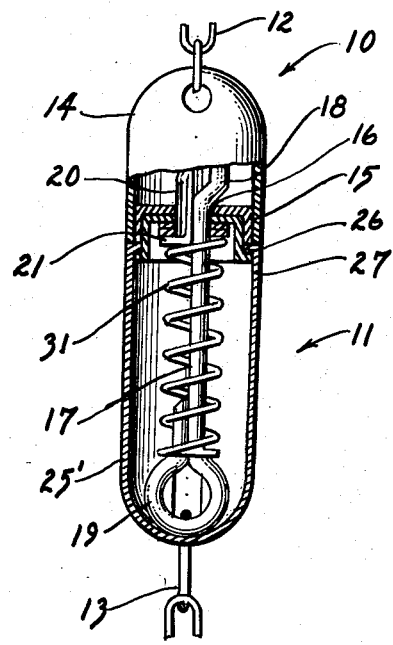
fig. 3
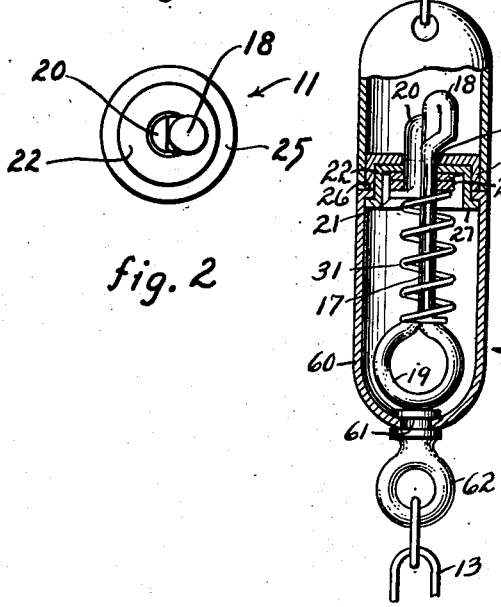
fig. 2
fig. 9.
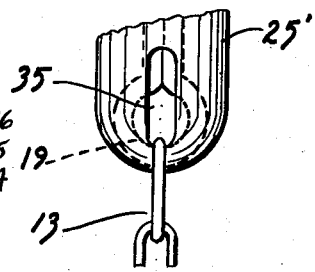
fig. 4
INVENTOR.
Henry J. Modrey
BY
ATTORNEY April 27, 1954   H. J. MODREY   2,676,822
COUPLING DEVICE WITH SINGLE ACTUATING SLEEVE
Filed Dec. 21, 1948   2 Sheets-Sheet 2

INVENTOR.
BY Henry J. Modrey
ATTORNEY

Patented Apr. 27, 1954

2,676,822

UNITED STATES PATENT OFFICE 2,676,822

COUPLING DEVICE WITH SINGLE ACTUATING SLEEVE

Henry J. Modrey, Newark, N. J., assignor, by mesne assignments, to Interlock Corporation, New York, N. Y., a corporation of New Jersey Application December 21, 1948, Serial No. 66,440

23 Claims. (Cl. 287—20.5)

This invention relates to mechanical couplings, clutches, connectors and similar devices for detachably connecting two elements or members. More particularly, the invention relates to mechanical connecting devices of the type in which a male coupling member comprises a clamping rod having an enlarged head and a wedging slide, the clamping rod and the wedging slide being slidable relative to each other. The female member contains an opening or hole which corresponds in configuration approximately to the joint cross-section through the clamping rod just below the enlarged head, and the wedging member. For purpose of latching the male coupling member to a female coupling member, the clamping rod is inserted into said opening or hole in the female member. As soon as the enlarged head has passed through the said opening or hole, space becomes available for the wedging slide to enter alongside of the clamping rod. The clamping rod is now secured by the clamping head overhanging the female member opening and the wedging slide preventing a withdrawal of the clamping head through the female member opening. The two clamping members, thus latched together, are released by retracting the wedging slide relative to the clamping head and from the female member opening so as to permit withdrawal of the clamping head from the female member opening, resulting in separation of the two coupling members.

With connecting devices, as hitherto known, engagement of the coupling members is effected by manipulation of a part of the male coupling member operatively connected with the clamping rod, and separation by manipulation of another part of the male coupling member operatively connected with the wedging slide.

Connecting devices of the general type, above referred to, are more fully disclosed in British Patent 605,434 of the applicant herein and in applicant's pending U. S. patent application Ser. No. 555,189, filed September 21, 1944, now Patent 2,464,543, issued March 15, 1949.

One of the objects of the present invention is to provide a mechanical connecting device of the general type, above referred to, which is considerably simpler and more convenient in operation than the connecting devices, as hitherto known, in that manipulation of one single part of the male coupling member in opposite direction effects engagement and separation.

Another object of the present invention is to provide a mechanical connecting device of the general type, above referred to, which permits engagement and separation of the two coupling members by manipulation of one and the same part of the male coupling member. Such an arrangement affords the important advantage that the coupling members can be connected and separated without requiring a change in the grip of the operator.

Another object of the invention is to provide a mechanical connecting device the two coupling members of which, when engaged, will part upon manipulation of the aforesaid part of the male coupling member while the coupling members are subjected to a strain or pull tending to separate the coupling members. This arrangement has the advantage that two elements connected by a connecting device according to the invention can be separated without preceding relaxation of the strain or pull to which the said elements may be subjected.

Another object of the invention is to provide a connecting device according to the invention, the two coupling members of which, when latched together, can be separated at will, by manipulation in opposite direction of the aforesaid part of the male coupling member, and will automatically separate when subjected to a pull or strain in excess of a predetermined maximal value. Such an arrangement permits use of a connecting device according to the invention as a maximal clutch or coupling which can be advantageously employed wherever clutches and couplings of this type are used in industry.

Other and further objects, features and advantages of the invention will be hereinafter set forth and the novel features thereof defined by the appended claims forming part of the application.

In the accompanying drawings, several now preferred embodiments of the invention are shown by way of illustration and not by way of limitation.

In the drawings:

Fig. 1 is a longitudinal sectional view of the male and female coupling members of a connecting device according to the invention, the members being shown disengaged.

Fig. 2 is a plan view seen along line 2—2 of Fig. 1.

Fig. 3 is a longitudinal sectional view of the two coupling members of a modification of a connecting device according to the invention, the coupling members being shown latched together.

Fig. 4 is a fragmentary view of the male coupling member shown in Fig. 3.

Fig. 9 is a longitudinal sectional view of still another modification of the connecting device according to the invention, the coupling members being shown fully engaged.

Figure 5:
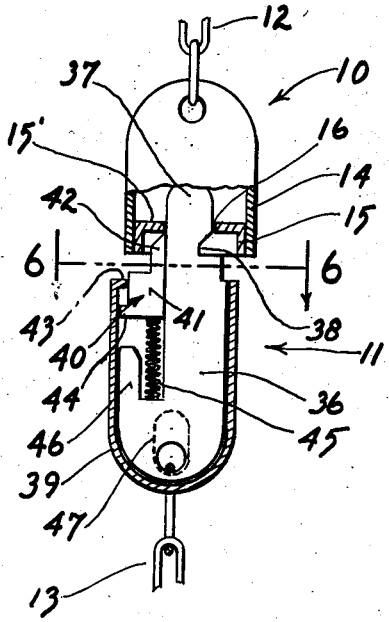
Fig. 5 is a longitudinal sectional view of another modification of a connecting device according to the invention, the male coupling member being shown in partly engaged position.

Referring first to Figs. 1 and 2 in detail, these figures show a connecting device or coupling according to the invention comprising a female coupling member, generally designated by 10, and a male coupling member generally designated by 11. The two coupling members serve to connect detachably two elements which are shown in the present instance as chains 12 and 13 respectively. It should be understood in this connection that a connecting device according to the invention lends itself to wide spread applications among which are at the present time, cattle fasteners, marine rope and cable fasteners, tie rod couplings for aircraft, clutches for purposes of power transmission, automatic trailer couplings, couplings for agricultural implements, safety catches for necklaces, key holders, etc. The size of the coupling members, the shape of the coupling, the method of its attachment to the two elements, and the material used for the same must of course be adapted to the particular field of application. In certain instances, the female coupling member may form part of one of the elements to be connected.

The female coupling member is shown as a substantially cup-shaped body 14 in the open end of which is fitted an also substantially cup-shaped member 15 having an opening 16 through its bottom wall. As will appear from the subsequent description, member 15 with its opening 16 constitutes the operating component of the female coupling member. The part in which it is supported may have any suitable shape, also member 15 may be fastened directly to or form part of element 12. Finally, member 15 may be integral with the coupling component 14.

The male coupling member 11 comprises a clamping rod 17 having on one end an enlarged clamping head 18 and supporting on the other end the element 13 by means of a closed loop or an eyelet 19. The clamping rod is shown as being made of a wire or bar having a semi-circular cross-section and bent-off at both ends to form clamping head 18 and eyelet 19 respectively. However, it should be mentioned in this connection that the clamping rod may have any other suitable cross-section, such as a flat rectangular cross-section. The clamping head may be formed by enlarging the bar or wire on one end, or else the entire clamping rod may be cast or pressed. Element 13 can be secured to the clamping rod by any suitable means, or may even be integral with the clamping rod. The clamping head is preferably so shaped that it is eccentric relative to the joint axis of the clamping rod, just below the clamping head, and a wedging slide more fully described in the next paragraph.

The clamping rod, particularly the head portion thereof, coacts with a wedging slide 20 mounted slidably relative to the clamping rod, alongside thereto. The wedging slide is shown as having a semi-circular cross-section, as can best be seen on Fig. 2, and a flange portion 21. The wedging slide may also have a cross-section different from the one shown on Figs. 1 and 2.

The relative cross-sectional areas of opening 16 and clamping head may be so selected that the cross-section of the clamping head fills approximately the cross-sectional area of female member opening 16 while the combined cross-section of the rod proper just below the clamping head and of the wedging slide must always substantially fill opening 16 and the combined cross-section of the clamping head and the wedging slide always exceeds the cross-sectional area of the female member opening, so that the clamping head, when inserted, overhangs the female member opening. The tip of the clamping head and of the wedging slide are preferably rounded as shown in Fig. 1 to facilitate the insertion of these elements into the female member opening.

The clamping rod and the wedging slide are both slidably guided in a guide member 22 shown as a cup-shaped element having an opening 23 from which the clamping head and the wedging slide protrude with the clamping head being arranged to be seated against or slightly protrude above the exterior of the guide member. In the latter case, the clearance between clamping head 18 and exterior of guide member 22 should be less than the thickness of wall member 15 so as to insure spring-loading of the entire assembly when in situ. The wedging slide is retained in guide member 22 by flange 21. One or more washers 24 may be provided to adjust the position of the wedging slide relative to the clamping head. Opening 23 is so selected that it is substantially filled by the wedging slide and the clamping rod.

Guide member 22 is slidably supported by an actuating member 25 shown as a tubular sleeve having on one end an inwardly extending annular flange 26 engageable with a corresponding outwardly extending flange 27 of guide member 22.

As will be apparent, flanges 26 and 27 permit a telescopic movement of the guide member toward the interior of sleeve 25.

The opposite end of sleeve 25 is also provided with an inwardly extending flange 28 engageable with a disc 29 secured on the clamping rod, against displacement in axial direction, by engaging a groove 30 in the clamping rod. As will be apparent, flange 28 and disc 29 permit a limited displacement of the sleeve relative to the clamping rod in one direction while fixing the relative position of the clamping rod and the sleeve against displacement in the opposite direction.

It will be evident from the previous description that the control of the relative movements of the clamping rod 17, the guide member 22 and the actuating member 25, as effected by flanges 26, 27 and flange 28, disc 29, respectively can also be accomplished by various other arrangements, equivalent in function. For instance, instead of flanges 26 and 27 a longitudinal slot may be provided in sleeve 25 engaged by a nose extending from the guide member 22.

A spring 31 shown as a coil spring surrounding rod 17 and abutting on one end against wedging slide 20 and at the other end against disk 29 serves to bias the components of the male coupling member into the respective relative positions in which they are shown in Fig. 1.

The operation of the connecting device according to Figs. 1 and 2 is as follows:

Let it be assumed that an operator desires to latch the male coupling member to the female coupling member. For this purpose, he grips actuating member 25 and inserts the tip of the clamping head 18 into the female member opening 16. The clamping rod and the wedging slide are so arranged and positioned that the tip of the clamping head extends beyond the tip of the wedging slide when the two coupling members are detached from each other, so that the tip of the clamping head can be conveniently fitted into the female member opening while the tip of the wedging slide will abut against the bottom wall of member 15. As a result, pressure applied to the actuating member 25 toward the female coupling member will push the wedging slide back relatively toward the clamping head, thereby permitting deeper penetration of the clamping head into the female member opening. As guide member 22 is used in an eccentric position relative to the cup-shaped member 15, it abuts on the side opposite to the clamping head against the edge of member 15. Continued pressure of actuating member 25 will therefore tend to push the guide member 22 into member 25. Consequently, the wedging slide which moves back together with the guide member is no longer adjacent to the clamping head but juxtaposed to the rod proper so that the clamping head can be passed entirely through the female member opening. When now the actuating member is released, the tension of spring 31 will snap the wedging slide forward into the female member opening so that this opening is substantially filled and the clamping head can no longer slip out of the female member opening by reason of its overhanging portion. During this final step, the cup portion of guide member 22 has moved sideways from its eccentric position to an axial position, and will be seated in the cup portion of member 15 with the opposing wall edges of the male coupling member and the female coupling member abutting against each other so that the respective outside walls of the two coupling members are flush. The two coupling members are now latched together.

The locking action as described may also be achieved if the male coupling member is finally attached to one of the elements, and the female coupling member is movable, and is pressed against the male coupling member, with the clamping head penetrating opening 16.

As will be evident from the previous description the operations latching the two coupling members together involve a certain lateral movement of the male coupling member relative to the female coupling member (see Fig. 5 showing the two members in an intermediate position). To permit such lateral relative movement, a suitable relationship between the width and the depth of cup-shaped members 15 and 22 must be maintained.

If it is desired to separate the two coupling members, the operator grips sleeve 25 and pulls the same away from the female coupling member. The clamping rod with its head is latched to the female coupling member. However, as will be apparent from Fig. 1, the arrangement of flange 28 and disc 29 permits a displacement of sleeve 25 away from the female coupling member. As a result of such retraction of the sleeve, guide member 22 and with it wedging slide 20 are also retracted relative to the clamping head so that, after a certain joint backward movement of the actuating sleeve and the clamping head, the latter is withdrawn from the female member opening. Spring 31 now returns all parts of the male coupling member into the relative positions shown in Fig. 1.

As will appear from the previous description and an examination of Figs. 1 and 2, the engagement and separation of the two coupling members are both effected by manipulation of the same actuating member 25 without requiring any change in grip. An analysis of the function of the connecting device shows that in effect actuating member 25 is coupled with the clamping rod for the engagement operation and with the wedging slide for the disengagement operation. From this analysis it also follows that two coupling members can be latched together by holding the clamping rod directly when the two coupling members are pressed together.

The wedging slide is shown in Figs. 1 and 2 as being slidable relative to the guide member but it could also be fixed to or form part of the guide member. However, such an arrangement has the disadvantage of requiring a longer stroke for the coupling operation.

The modification according to Figs. 3 and 4 is similar to the embodiment according to Figs. 1 and 2. Corresponding parts are designated by the same reference characters. The only essential difference resides in the arrangement of the coupling between clamping rod 17 and the actuating sleeve designated by 25'. According to Figs. 3 and 4, sleeve 25' is closed at its lower end and provided with an elongated longitudinal slot 35. Element 13 is connected to the clamping rod by engaging the eyelet 19 thereof through slot 35.

As will be apparent from Fig. 3, the clamping rod with its eyelet 19 abuts against the closed bottom of sleeve 25' when the two coupling members are latched together (and also when the two members are fully separated). In other words, the closed bottom and eyelet 19 perform the same function as flange 28 and disc 29 of Fig. 1, to wit, to fix the position of the clamping rod relative to the actuating member when the latter is held and the male coupling member is applied to the female coupling member to latch the two members together. Slot 35 permits the required retraction of actuating member 25' relative to the clamping rod when the two coupling members are latched together and are to be separated by a retraction of the actuating member.

Figure 6:
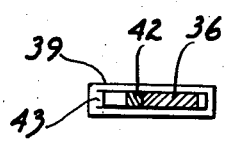
Fig. 6 is a section along line 6—6 of Fig. 5.

Figs. 5 and 6 show another modification of a connecting device according to the invention based upon the same principle. The modification of Figs. 5 and 6 is simplified in design in comparison to the embodiments of Figs. 1 to 4. The wedging slide and the clamping rod are so formed as to take over and replace the functions described with reference to the guide member 22 as shown in Figs. 1 and 3. The female coupling member 10 of Fig. 5 is similar in design to the female coupling member of the previously described connecting devices.

The male coupling member comprises a clamping rod 36 shown as a flat bar and having on one end a clamping head 37 formed by providing a gap or recess 38 in the bar. The other end of the clamping rod is shaped to fill substantially the cross-section of an actuating member 39 shown as a substantially rectangular sleeve with a rounded off closed bottom. The male coupling member further comprises a wedging slide, generally designated by 40, slidable within actuating sleeve 39 alongside the clamping rod. As can best be seen on Fig. 5, the wedging slide has a wide portion 41 and a narrow portion 42 tapered at its outer end. To limit displacement of the wedging slide relative to the clamping rod, a flange 43 extends inwardly from sleeve 39 and is engageable with a flange or lug 44 extending from slide portion 41. A spring 45 shown as a loaded coil spring abuts on one end against the clamping rod and at the other end against the wedging slide to urge the slide into a position in which flanges 43 and 44 engage each other and the inner end of the clamping rod 36 abuts against the closed bottom of sleeve 39. To secure the spring in its proper position, an extension 46 of the clamping rod may be provided which extension together with the main portion of the clamping rod and the walls of sleeve 39 forms a cage for the spring. The head of the clamping rod and the wedging slide are so arranged and positioned that the tip of the clamping head extends beyond the tip of the wedging slide when flanges 43 and 44 are in engagement. The cross-section of clamping head 37 is selected to fill substantially the cross-section of the female member opening 16. Similarly, the combined cross-section of slide portion 42 and the neck or throat of the clamping rod formed by gap or recess 38 also substantially fill the female member opening. The axial length of the neck or throat of the clamping rod corresponds substantially to the thickness of the bottom wall 15' of member 15. Finally, the combined width of rod 36 and slide portion 41 corresponds substantially to the width of the cup-shaped portion of member 15. Similarly, the axial length of the clamping rod portion protruding from sleeve 39 when the clamping rod is in the position shown in Fig. 5 corresponds substantially to the depth of the cup-shaped portion of member 15.

Element 13 is secured to the clamping rod by being extended through an opening or elongated slot 47 in the wall of sleeve 39 to permit axial relative displacement between the actuating sleeve and the clamping rod.

A connecting device as shown in Figs. 5 and 6 is useful for many applications. It is particularly practical as a jewelry clasp by reason of its flat shape and its simplicity permitting manufacture of very small clasps.

The operation of the embodiment according to Figs. 5 and 6 is as follows:

Fig. 5 shows the male coupling member in a semi-engaged position. Let it be assumed that it is desired to complete the latching operation. The operator then grips sleeve 39 and presses the same toward the female coupling member. The clamping rod abutting against the closed bottom of sleeve 39 remains stationary relative to the sleeve while the wedging slide 40 is pressed backward relative to the clamping head and the rod 36 proper until finally the clamping head slips through opening 16. The edge of wall 15' now engages gap 38 thereby leaving sufficient space within opening 16 for the wedging slide to snap forward by the action of spring 45, thereby latching the clamping head within the female coupling member.

The portion of rod 36 protruding above the upper edge of sleeve 39 and also part of slide portion 40 (thus conjointly replacing the functions of guide member 22 shown in Figs. 1 and 3) are now seated within the cup-shaped portion of member 15 so that the outer walls of the coupling members are substantially flush.

In this connection, attention is directed to the previously mentioned lateral movement of the male coupling member relative to the female coupling member during the engagement operation. To illustrate the said lateral movement, the two coupling members are shown out of alignment.

When it is now desired to separate the two coupling members, the operator again grips sleeve 39 and pulls the same away from the female coupling member. As a result, the wedging slide is pulled back relative to the clamping head, flanges 43, 44 being in engagement. The oversized hole 47 permits displacement of sleeve 39 relative to the clamping rod although the latter is held with its head within the female coupling member. When the wedging slide is sufficiently withdrawn, the clamping head can pass through opening 16. The separation of the two coupling members is now completed and spring 45 returns slide 40 into its forward position in which flanges 43 and 44 are engaged and the clamping rod into the position in which the inner end thereof abuts against the bottom of sleeve 39.

As will be noted, the modification of Figs. 5 and 6 also permits engagement and disengagement of the coupling members by manipulation of one and the same actuating member.

Figure 7:
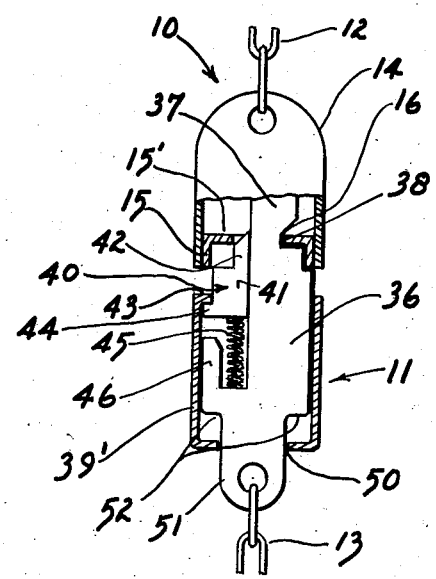
Fig. 7 is a longitudinal sectional view of still another modification of a connecting device according to the invention, the male coupling member being shown partly disengaged.

Fig. 7 shows a modification similar in design to the modification according to Figs. 5 and 6 with the exception that an actuating sleeve 39' is provided which has a slot 50 in its bottom through which slot an ear 51 of the clamping rod is extended. Element 13 is secured to the ear portion protruding from sleeve 39'. The clamping rod is set off at 52 to permit displacement of the sleeve relative to the clamping rod during the disengagement operation. In other words, the set-off 52 corresponds in function to the oversized hole 47 of Fig. 5.

The operation of the embodiment of Fig. 7 is as follows:

The male coupling member is shown in Fig. 7 in a semi-disengaged position. It should be noted in this connection that the shoulders 52 of the clamping rod abut against the bottom of sleeve 39' when the two coupling members are fully disengaged or fully latched together.

Let it be now assumed that it is desired to complete the disengagement operation with the embodiment according to Fig. 7. The operator then grips sleeve 39' and pulls the same further away. As a result, the wedging slide is withdrawn from the female member opening 16 so that the clamping head 37 can slip out of this opening. The two coupling members are now separated and spring 45 will return the clamping rod into its abutment position with sleeve 39'.

When it is desired to engage the two coupling members the operator again grips sleeve 39', inserts clamping head 37 into opening 16 and presses the male coupling member toward the female coupling member. As a result, the wedging slide is pushed back, the clamping rod remaining fixed relative to the sleeve by reason of shoulders 52 resting against the bottom of the sleeve. Consequently, the two members can be latched together in the same manner as was described in connection with Fig. 5.

Figure 8:
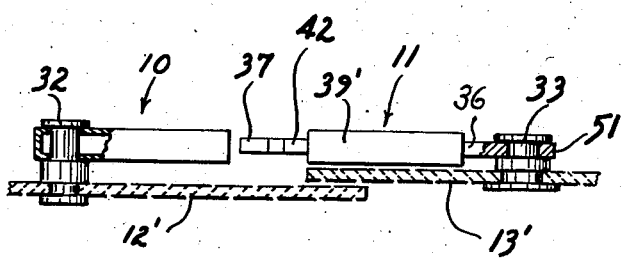
Fig. 8 is a cross-sectional view of the connecting device shown in Fig. 7, further modified for attachment to flat surfaces.

Fig. 8 shows a modification of the invention primarily adapted to connect two elements such as plates or other flat surfaces as they occur in boxes. As the locking action proper takes place between the female coupling member or receiver and the clamping rod, the latter is modified for attachment to one of the elements while the actuating sleeve is free to slide on the element to which the clamping rod is attached.

According to Fig. 8, female coupling member 10 is pivoted by means of a rivet pivot 32 to a flat surface 12' and male coupling member 11 is secured to another flat surface 13' by pivoting clamping rod 36 to element 13' by means of a pivot or rivet 33.

The design according to Fig. 8 is substantially similar to the design of Fig. 7 so that Fig. 8 will be understandable without further detailed description.

The embodiment according to Fig. 9 is similar in design to the embodiment of Fig. 3 and also of Fig. 1 with the important difference that element 13 is not fastened to the clamping rod as it was the case with all previously described embodiments but to the actuating sleeve, designated by 60. Element 13 can be secured by any suitable means. It is shown as being secured to a rivet 61 having an eyelet 62 and riveted to sleeve 60. The eye 19 of the clamping rod 17 abuts loosely against the bottom of sleeve 60 or the head of rivet 61.

The operation of the embodiment according to Fig. 9 is as follows:

The engagement operation of the two coupling members is the same as has been described in connection with Fig. 3 and also the normal disengagement operation, that is, for engagement, the operator grips sleeve 60 and presses the same toward the female coupling member and, for disengagement, pulls sleeve 60 away from the female coupling member.

Let it be now assumed that a strong pull is applied to chain element 13 while the two coupling members are latched together. Reverting first back to the previously described connecting devices, it will be apparent that a pull on chain element 13 will be transmitted to the clamping head and the clamping head will simply be pressed tighter against the female wall member in which it is seated. In other words, the two coupling members will remain latched together and resist a separating pull until mechanically destroyed. However, in the embodiment according to Fig. 9 a pull on chain element 13 is in effect a pull on sleeve 60. As a result, the two coupling members will be separated in the same manner as if sleeve 60 is manipulated when the pull on chain 13 is strong enough to overcome the action of spring 31 urging the components of the male coupling into the positions shown in Fig. 9. Hence, the connecting device according to Fig. 9 constitutes a maximal coupling which will automatically release in response to a pull in excess of a predetermined value. The release value can be conveniently adjusted by varying the strength and tension of spring 31.

It will be apparent that the principle of Fig. 9 can also be applied to the designs according to Figs. 5 and 7 by simply securing element 13 to the actuating sleeve.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. A mechanical coupling for detachably coupling two elements, the said coupling comprising a male coupling member and a female coupling member, each of said coupling members being associated with one of said elements to be mechanically coupled, the female coupling member having an opening therethrough, the male member including a clamping rod having an enlarged clamping head on one end inserted in the female member opening, a wedging member slidably disposed alongside said clamping rod, the combined cross-section of the clamping rod below the clamping head and of the wedging member substantially filling the female member opening, a loaded spring urging the wedging member toward and alongside the clamping head, and actuating means for effecting engagement and separation respectively of the coupling members, said actuating means including an actuating member slidable relative to the clamping rod and coupled with the wedging member upon movement of the said actuating member in the direction away from the clamping head and coupled with the clamping rod upon movement in opposite direction, movement of the said actuating member away from the clamping head effecting displacement of the wedging member relative to the clamping head for insertion of the latter in the female member opening when the actuating member is held and moved toward the female coupling member for the purpose of latching the coupling members together upon release of the spring tensioned wedging member, and so as to effect withdrawal of the actuating member together with the wedging member relative to the clamping head when the clamping head is latched to the female member and a pull is applied to the actuating member away from the female member for the purpose of separating the coupling members.

2. A mechanical coupling for detachably coupling two elements, the said coupling comprising a male coupling member and a female coupling member, each of said coupling members being associated with one of the elements to be mechanically coupled, the female coupling member having an opening therein, the male member including a clamping rod having an enlarged clamping head on one end inserted in the opening of the female member, a wedging member slidably disposed alongside said clamping rod, the combined cross-section of the clamping rod below the clamping head and of the wedging member substantially filling the female member opening, loaded spring means urging the wedging member toward and alongside the clamping head, and actuating means for effecting engagement and separation respectively of the coupling members, said actuating means including a single actuating member slidable relative to the wedging member and also slidable relative to the clamping rod when the actuating member is held, and to permit displacement of the actuating member and with it of the wedging member relative to the clamping head when the clamping rod is held in the female coupling member, whereby, upon insertion of the clamping head into the female coupling member opening while the actuating member is held and moved against the female coupling member, the wedging member is pushed back relative to the clamping head while the clamping rod is held against the said abutment, thereby permitting passage of the clamping head through the female member opening, said spring means returning the wedging member into its position alongside the clamping head for preventing withdrawal of the clamping head through the female member opening thus latching the coupling members together, and whereby, upon withdrawal of the actuating member relative to the clamping rod and away from the engaged female member, the wedging member is retracted from its position alongside the clamping head and the engaged female member opening thus permitting passage of the clamping head through the female member opening and separation of the coupling members.

3. A mechanical coupling for detachably coupling two elements, the said coupling comprising a male coupling member and a female coupling member, each of said coupling members being associated with one of the elements to be mechanically coupled, the female coupling member having an opening therein, the male member including a clamping rod having an enlarged clamping head on one end inserted in the female member opening, a wedging member slidably disposed alongside said clamping rod, the combined cross-section of the clamping rod below the clamping head and of the wedging member substantially filling the female member opening, loaded spring means arranged to urge the wedging member toward and alongside the clamping head, retaining means on the male member having an opening therethrough, the clamping head and the wedging member being slidably extended through the said opening in the retaining means and retained by the same in a relative position to each other in which the clamping head extends beyond the wedging member in axial direction, the clamping head being arranged to be seated against the exterior of the retaining means by the action of said spring means, and an actuating member for effecting engagement and separation respectively of the coupling members, said actuating member slidably supporting the retaining means and being slidably connected with the clamping rod for retraction of the retaining means and the wedging member relative to the actuating member and the clamping head when the actuating member is held and for retraction of the actuating member together with the retaining means and the wedging member when the clamping rod is held in the female coupling member, whereby upon insertion of the clamping head into the female coupling member opening while the actuating member is moved against the female coupling member, the retaining means together with the wedging member is pushed back relative to the clamping head thereby permitting passage of the latter through the female member opening, said spring means returning the wedging member into its position alongside the clamping head thereby preventing withdrawal of the clamping head through the female member opening thus latching the coupling members together, and whereby, upon withdrawal of the actuating member together with the retaining means relative to the clamping rod and away from the female member, the wedging member is retracted from the female member opening thus permitting passage of the clamping head through the female member opening and separation of the coupling members.

4. A mechanical coupling for detachably coupling two elements, the said coupling comprising a male coupling member and a female coupling member, each of said coupling members being associated with one of the elements to be mechanically coupled, the female coupling member having an opening therein, the male coupling member including a housing, the said housing constituting an actuating member for effecting engagement and separation of the coupling members, a clamping rod having an enlarged clamping head on one end slidably disposed within and relative to the housing with the clamping head protruding from the housing, said clamping head being inserted in the female member opening, a wedging member slidably disposed within the housing alongside the clamping rod, the combined cross-section of the clamping rod below the clamping head and of the wedging member being substantially filling the female member opening, retaining means formed by the housing at the end thereof opposite to the clamping head and engaging the clamping rod for limiting displacement of the clamping rod relative to the housing in the direction for moving the clamping head toward the housing, second retaining means formed by the housing at the other end thereof and coacting with the wedging member for limiting displacement of the wedging member toward the clamping head to a position in which the clamping head extends beyond the wedging member, and loaded spring means within the housing urging the clamping rod and the wedging member into the respective limit positions, whereby, upon insertion of the protruding clamping head into the female member opening while the housing is moved together with the clamping rod toward the female member, the wedging member is pushed back relative to the housing and the clamping head while the clamping rod is retained in its said limit position in the housing, thereby permitting passage of the clamping head through the female member opening thus latching the coupling members together, and whereby, upon retraction of the housing together with the wedging slide relative to the clamping head and away from the female member when the clamping head is retained in the female coupling member, the wedging member is withdrawn from the engaged female member opening thus permitting passage of the clamping head through the female member opening and separation of the coupling members.

5. A mechanical coupling for detachably coupling two elements, the said coupling comprising a male coupling member and a female coupling member, each of said coupling members being associated with one of the elements to be mechanically coupled, the female coupling member having an opening therein, the male coupling member including a substantially sleeve-shaped actuating member, a clamping rod inserted in the female member opening, said clamping rod having an enlarged clamping head on one end slidably disposed within the sleeve member, a wedging member slidably disposed within the sleeve member alongside the clamping rod, a guide member having an opening therethrough slidably fitted in the sleeve member, said clamping rod and wedging member being slidably extended through the guide member opening with the clamping head protruding from the sleeve member, first retaining means formed by the sleeve member and arranged to engage the guide member upon retraction of the sleeve member relative to the clamping head for joint withdrawal of the sleeve member and the guide member together with the wedging member, and to provide for retraction of the guide member with the wedging member relative to the clamping head and the sleeve member when the sleeve member is held, second retaining means formed by the sleeve member and arranged to engage the clamping rod and to fix the same in its position relative to the sleeve member when the sleeve member is held for retraction of the guide member with the wedging member relative to the sleeve member, and loaded spring means on the male member urging the guide member with the wedging member toward the clamping head and the clamping rod into its said fixed position relative to the sleeve member, whereby, upon insertion of the clamping head into the female member opening while the actuating sleeve member is held and moved against the female member, the guide member together with the wedging member is pushed back relative to the sleeve member and the clamping rod, the latter being held in its said fixed position in the sleeve member, thereby permitting passage of the clamping head through the female member opening for latching the coupling members together, and whereby, upon retraction of the sleeve member and with it of the guide member and the wedging member relative to the clamping head when held in the engaged female coupling member, the wedging member is withdrawn from the female member opening thus permitting passage of the clamping head through the female member opening and separation of the coupling members.

6. A mechanical coupling as described in claim 5, wherein the first retaining means between the sleeve member and the guide member comprise catch means on the sleeve member and the guide member engageable with each other for joint movement of the sleeve member and the guide member with the wedging member away from the clamping head and for limiting displacement of the guide member jointly with the wedging member toward the clamping head, and disengageable from each other for joint movement of the guide member and the wedging member relative to the sleeve member and away from the clamping head.

7. A mechanical coupling as described in claim 6, wherein said guide member comprises a substantially cup-shaped element having an opening in the bottom for passage of the clamping rod and the wedging member and having lateral catch means engageable with the corresponding catch means of the sleeve member, said coacting catch means being arranged and positioned to retain the guide member against the action of the spring means in a position protruding from the sleeve member.

8. A mechanical coupling as described in claim 5, wherein the said first retaining means between the sleeve member and the guide member comprise catch elements in form of flanges extending inwardly and outwardly respectively from said members and engageable with each other so as to couple the said two members together for joint withdrawal relative to the clamping head, and to provide for telescoping of the guide member into the sleeve member away from the clamping head and against the action of the spring means.

9. A mechanical coupling as described in claim 5, wherein said wedging member comprises a slide slidable in said guide member opening and retained therein against the action of the spring means by a collar abutting against the inside of the guide member.

10. A mechanical coupling as described in claim 5, wherein said second retaining means coacting with the clamping rod comprise catch means at the sleeve member engageable with the clamping rod so as to fix the position of the latter relative to the sleeve member against axial movement in one direction while providing for limited axial movement of the clamping rod in opposite direction.

11. A mechanical coupling as described in claim 5, wherein said second retaining means coacting with the clamping rod comprise a catch element at the sleeve member and a catch element at the clamping rod, said catch elements being positioned to be engageable with each other for securing the clamping rod in a fixed position relative to the sleeve member when the latter is held and pressure is applied to the guide member and the wedging member for telescoping the said members into the sleeve member.

12. A mechanical coupling as described in claim 11, wherein the catch element at the sleeve member comprises a flange inwardly extending from the sleeve member and the catch element at the clamping rod comprises a projection radially extending from the clamping rod and positioned to be engageable with said flange.

13. A mechanical coupling as described in claim 5, wherein said second retaining means coacting with the clamping rod comprise an end wall portion of the sleeve member positioned to form an abutment for the end of the clamping rod opposite to the clamping head for securing the clamping rod in a fixed position relative to the sleeve member when the latter is held and pressure is applied to the guide member and the wedging member for telescoping the said members into the sleeve member.

14. A mechanical coupling as described in claim 5, wherein means are provided on the clamping rod for securing one of the elements thereto.

15. A mechanical coupling as described in claim 13, wherein means are provided on the clamping rod for attaching one of said elements to the clamping rod, and wherein said sleeve member has a lateral longitudinal slot, said attachment means being accessible through said slot to permit relative displacement of the sleeve member and the clamping rod.

16. A mechanical coupling as described in claim 5, wherein means are provided on the sleeve member for attaching one of said elements to the sleeve member for retraction of the said elements to the sleeve member for retraction of the said member against the action of the spring means in response to a pull applied to the sleeve member in excess of the strength of said spring means when the male coupling member is latched to the female coupling member.

17. A coupling for detachably coupling two elements, the said coupling comprising a male coupling member and a female coupling member, each of said coupling members being associated with one of said elements to be mechanically coupled, the female coupling member including a wall member having an opening therethrough, the male member including a clamping rod having an enlarged clamping head on one end inserted in said female member opening, a wedging member slidably disposed alongside said clamping rod, the combined cross-section of the clamping rod below the clamping head and the wedging member substantially filling the female member opening, an actuating member for effecting engagement and separation respectively of the coupling members, the said actuating member being disposed on the male coupling member slidable relative to the clamping rod, loaded spring means arranged to urge the wedging member toward and alongside the clamping head, first catch means formed by the actuating member and coacting with the wedging member to limit displacement of the wedging member toward the clamping head to a position in which the clamping head extends beyond the wedging member in axial direction, and second catch means engageable with the clamping rod so as to permit relative displacement of the clamping rod and the actuating member in a direction causing withdrawal of the wedging member relative to the clamping head and to secure the clamping rod in a position fixed relative to the actuating member when the latter is held and pressure is applied upon the clamping rod toward the second catch means, whereby, upon insertion of the clamping head into the female coupling member opening while the actuating member is held and moved against the female coupling member, the wedging member is pushed back while the clamping rod is fixedly held relative to the actuating member, thereby permitting passage of the clamping head through the female member opening, said spring means returning the wedging member into its position alongside the clamping head thus preventing withdrawal of the clamping head through the female member opening for latching the coupling members together, and whereby, upon withdrawal of the actuating member relative to the clamping rod and away from the engaged female member when the clamping head is held in the female member, the wedging member is retracted from the engaged female member opening thus permitting passage of the clamping head through the female member opening and separation of the coupling members.

18. A mechanical coupling for detachably coupling two elements, the said coupling comprising a male coupling member and a female coupling member, each of said coupling members being associated with one of the elements to be mechanically coupled, the female coupling member including a wall member having an opening therethrough, the male member including a sleeve-shaped actuating member open on one end and having an abutment portion on the other end, a clamping rod slidably disposed within the sleeve member, said rod having a clamping head on one end formed by a recessed portion of the rod and inserted in the female member opening, the longitudinal width of said recess corresponding substantially to the thickness of the wall member of the female coupling member, the clamping head and the recessed portion of the clamping rod protruding from the sleeve member, the opposite end of the rod being engageable with the abutment portion of the sleeve member, a wedging member mounted slidably within the sleeve member alongside the clamping rod adjacent to the clamping head and the recessed portion thereof, the joint cross-section of the clamping rod below the clamping head and the wedging member substantially filling the female member opening, spring means within the sleeve member urging the wedging member toward and alongside the clamping head, and catch means formed by the sleeve member and engageable with the wedging member to limit displacement thereof toward the clamping head to a position in which the clamping head extends beyond the wedging member, and to withdraw the sleeve member together with the wedging member relative to the clamping head and the recessed rod portion, whereby, upon insertion of the clamping head into the female coupling member while the actuating sleeve member is held and moved against the female coupling member, the wedging member is pushed back relative to the clamping head, the clamping rod being fixedly held against said abutment portion, thereby permitting passage of the clamping head through the female member opening causing the recess of the clamping rod to engage the female wall member, said spring means returning the wedging member into its position along the clamping head thus preventing withdrawal of the clamping head through the female member opening for latching the coupling members together, and whereby, upon withdrawal of the actuating member relative to the clamping head and away from the female member when the clamping head is held in the female member opening, the wedging member is retracted from the engaged female member opening thus permitting passage of the clamping head through the female member opening and separation of the coupling members.

19. A mechanical coupling as described in claim 17, wherein means are provided on the clamping rod for attaching one of said elements to the clamping rod, said actuating member having an opening therethrough, said attachment means being accessible through said opening for attachment of the said element to the clamping rod to permit limited relative displacement of the clamping rod and the actuating member.

20. A male coupling member for a self-locking mechanical coupling of the type including a female coupling member having a receiving opening therein adapted to receive the male coupling member in locking connection for detachably coupling two elements, said male coupling member comprising a slidable guide member, a clamping rod disposed slidably relative to said guide member and having on one end an enlarged clamping head protruding beyond said guide member, a wedging member protruding from the guide member alongside the clamping rod and slidable relative to the clamping rod, yieldable means biasing the guide member and the wedging member toward the clamping head, and control means for effecting connection and disconnection of the coupling members, said control means comprising a control member in which said guide member and said clamping rod are slidably disposed, first coupling means operative for coupling the control member with the guide member, and second coupling means operative for coupling the control member with the clamping rod, said coupling means being arranged to be effective for coupling action in opposite directions so as to provide for displacement of the guide member with the wedging member relative to the control member and the clamping head in response to a control member movement in one direction and for displacement of the guide member and the wedging member conjointly with the control member relative to the clamping head in response to a control member movement in opposite direction, whereby, upon insertion of the clamping head in the said receiving opening and movement of the control member toward the female coupling member, the guide member together with the wedging member is pushed back relative to the clamping head thereby permitting passage of the clamping head through the receiving opening, said yieldable means biasing the wedging member into a position alongside the clamping head and within the said receiving opening for substantially filling the peripheral outline of said opening and preventing withdrawal of the clamping head from the receiving opening, and whereby, upon withdrawal of the control member conjointly with the guide member and the wedging member relative to the clamping head lodged in the female coupling member, the wedging member is retracted from the said receiving opening, thereby permitting passage of the clamping head through the receiving opening and separation of the coupling members.

21. A male coupling member as defined in claim 20, wherein said first coupling means comprise coacting abutment portions on the control member and the guide member respectively engageable one with the other to couple the guide member together with the wedging member to the control member for conjoint movement in one direction while providing for displacement of the guide member and the wedging member relative to the control member in opposite direction.

22. A male coupling member as defined in claim 20, wherein said second coupling means comprise coacting abutment portions on the control member and the clamping rod respectively engageable one with the other to limit relative displacement of the clamping rod and the control member in the direction for moving the clamping head toward the control member while providing for displacement of the control member relative to the clamping head in a direction away from the latter.

23. In a self-locking mechanical coupling for detachably connecting two elements, in combination a male coupling member and a female coupling member, said male coupling member comprising a slidable guide member, a clamping rod disposed slidably relative to said guide member and having on one end an enlarged clamping head protruding beyond said guide member, a wedging member protruding from the guide member alongside the clamping rod and slidable relative to the clamping rod, yieldable means biasing the guide member and the wedging member toward the clamping head, and control means for effective connection and disconnection of the coupling members, said control means comprising a control member in which said guide member and said clamping rod are slidably disposed with the end of the guide member from which said clamping head and said wedging member extend protruding from the control member, first coupling means operative for coupling the control member with the guide member, and second coupling means operative for coupling the control member with the clamping rod, said coupling means being arranged to be effective for coupling action in opposite directions so as to provide for a displacement of the guide member with the wedging member relative to the control member and the clamping head in response to a control member movement in one direction and for displacement of the guide member and the wedging member conjointly with the control member relative to the clamping head in response to a control member movement in opposite direction; and said female coupling member comprising a substantially cup-shaped body having a receiving opening in the bottom of said body, the combined cross-section of the clamping rod just below the clamping head and of the wedging member substantially filling the peripheral outline of said receiving opening and the combined cross-section of the clamping head and the wedging member exceeding the cross-section of said receiving opening, said cup-shaped body receiving the aforesaid protruding portion of the guide member and positively guiding the latter, whereby, upon insertion of the clamping head in the said receiving opening and movement of the control member toward the female coupling member, the guide member together with the wedging member is pushed back relative to the clamping head thereby permitting passage of the clamping head through the receiving opening, said yieldable means biasing the wedging member into a position alongside the clamping head and within said receiving opening for preventing withdrawal of the clamping head from the receiving opening and locking the coupling members together, and whereby, upon withdrawal of the control member conjointly with the guide member and the wedging member relative to the clamping head lodged in the female coupling member, the wedging member is retracted from the receiving opening for permitting passage of the clamping head through the receiving opening and separation of the coupling members.

References Cited in the file of this patent

UNITED STATES PATENTS

| Number | Name | Date |
|---|---|---|
| 2,187,929 | Blanc | Jan. 23, 1940 |
| 2,256,634 | Webb | Sept. 23, 1941 |
| 2,276,498 | Lear | Mar. 17, 1942 |
| 2,423,250 | Modrey | July 1, 1947 |
| 2,427,297 | Modrey | Sept. 9, 1947 |
| 2,464,543 | Modrey | Mar. 15, 1949 |
| 2,465,328 | Modrey | Mar. 22, 1949 |
| 2,508,767 | Modrey | May 23, 1950 |